Patented Jan. 17, 1950

2,494,875

UNITED STATES PATENT OFFICE 2,494,875

DI-n-BUTYLAMINO MALONIC ACID-ETHYL-DIETHYLAMINOETHYL ESTER

Rudolf Hirt, Muri, near Berne, Switzerland, assignor to Dr. A. Wander A. G., Berne, Switzerland, a corporation No Drawing. Application November 5, 1948, Serial No. 58,607. In Switzerland November 7, 1947

2 Claims. (Cl. 260—485)

The present invention relates to a process of preparing the heretofore unknown di-n-butylmalonic acid-ethyl-diethylaminoethylester of the formula

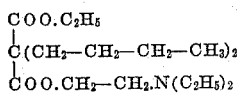

and to said ester product.

According to the invention, di-n-butylmalonic acid-monoethylester is mixed with an alcoholic solution of an alkali metal, a compound selected from the group consisting of a halogenethyldiethylamine, diethylaminoethanol and halides and sulfonic acid esters of the same is added to the mixture, the mass is heated, and, after removal of the alcohol and the formed alkali salts, the free base is removed and distilled in vacuum.

The di-n-butylmalonic acid-ethyl-diethylaminoethylester is obtained as a thin oil, which is essily soluble in dilute acids.

The di-n-butylmalonic acid-monoethylester employed as the starting material may be obtained by partial saponification of the corresponding diethylester or from the di-n-butyl-cyanacetic acid-ethyl ester, by heating with concentrated sulfuric acid to saponify to the amidoester, and then converting the acid amido group into a carboxylic group by treatment with alkali nitrate and sulfuric acid.

The di-n-butylmalonic acid-ethylaminoethylester of the present invention is pharmacologically interesting, as it has strong spasmolytic effects.

Example 1

38 parts of di-n-butyl cyanacetic acid ethyl ester are dissolved in a mixture of 12 parts of water and 98 parts of concentrated sulfuric acid. The solution is hereafter heated to 100° for 4 hours. It is then stirred into ice water, the precipitated thick resin is taken up in ether, the ether is washed with water and afterwards with diluted ammonia, dried and removed by distillation. The residue is recrystallised from petroleum ether. Di-n-butyl malonic acid ethyl ester amide is thereby obtained in the form of white needles which melt at 76°.

To transform the amide group into the carbonic acid group, 20 parts of this amide are dissolved in 180 parts of concentrated sulfuric acid, in a flask fitted with a mechanical stirrer. The solution is then cooled to 5–10°. At this temperature, a solution of 20 parts of sodium nitrite in 50 parts of water is added by drops within a period of 2 hours. The mixture is then heated for 1 hour to 45° and for a further half an hour to 95°. Hereby, a layer of oil separates from the mixture. The whole is then cooled and stirred into 300 parts of water. The mono acid thus obtained is washed with ether and separated from the ether by shaking with diluted ammonia. The ammoniacal solution is acidified, the deposited carbonic acid is taken up in ether, the ethereal solution is washed with water and dried, whereupon the ether is removed by distillation. The residue is then dried in a vacuum over a water bath. Di-n-butyl malonic acid mono ethyl ester is hereby obtained in the form of a thick oil, which congeals when allowed to stand for a fairly long time.

Example 2

1.2 parts of sodium, or 2 parts of potassium respectively are dissolved in 50 parts of absolute alcohol. This solution is mixed with 12 parts of di-n-butyl malonic acid mono ethyl ester, obtained in accordance with Example 1. 10 parts of β-chlorethyl-diethyl amine are added and the mixture is then boiled for 1 hour under a reflux condenser. Hereby sodium or potassium chloride is deposited. The alcohol is then removed by vacuum distillation, the residue is treated with water and shaken with ether. By shaking with diluted acetic acid, the base is separated from the ether, it is deposited in the aqueous solution by means of ammonia and taken up in ether; the solvent is removed by distillation. The residue is distilled in a vacuum: B. P. $_{0.1}$: 143°.

The di-n-butyl malonic acid ethyl diethyl amino ethyl ester thus obtained is a thin oil which dissolves readily in diluted acids.

What I claim is:

1. As a new product di-n-butylaminomalonic acid-ethyl-diethylaminoethylester.

2. Process for the preparation of di-n-butylmalonic acid ethyl-diethylaminoethylester which comprises mixing di-n-butylmalonic acid-monoethylester with an alcoholic solution of an alkali metal, adding a compound selected from the group consisting of halogenethyldiethylamine diethylaminoethanol, and their halides and sulfonic acid esters, heating the mass, and, after removal of the alcohol and the formed alkali halide, separating the free base and distilling in vacuum.

RUDOLF HIRT.

REFERENCES CITED

The following references are of record in the file of this patent:

UNITED STATES PATENTS

| Number | Name | Date |
|---|---|---|
| 2,255,447 | Kropp | Sept. 9, 1941 |
| 2,376,816 | Rosenberg | May 22, 1945 |
| 2,376,860 | Blicke | May 29, 1945 |
| 2,448,368 | Gresham et al. | Aug. 31, 1948 |

OTHER REFERENCES

Karrer, "Organic Chemistry," 2nd English ed., Elsevier Publishing Co., New York, N. Y., 1946, p. 211.